United States Patent [19]

Caldwell et al.

[11] E Re. 28,782

[45] Reissued Apr. 20, 1976

[54] TRAVELING-WAVE TUBE PACKAGE WITH INTEGRAL VOLTAGE REGULATION CIRCUIT FOR REMOTE POWER SUPPLY

[75] Inventors: John W. Caldwell, Fort Walton Beach, Fla.; Edward M. Smith, San Jose, Calif.

[73] Assignee: Teledyne, Inc., Los Angeles, Calif.

[22] Filed: Oct. 9, 1974 (Under Rule 47)

[21] Appl. No.: 513,700

Related U.S. Patent Documents

Reissue of:

[64] Patent No.: 3,697,799
Issued: Oct. 10, 1972
Appl. No.: 2,589
Filed: Jan. 13, 1970

[52] U.S. Cl. ..... 315/3.5; 315/39.3; 330/43; 331/82

[51] Int. Cl.[2] ..... H01J 25/34

[58] Field of Search ..... 315/3.5, 3.6, 39.3; 331/82; 330/43

[56] References Cited

UNITED STATES PATENTS

| | | | |
|---|---|---|---|
| 3,114,886 | 12/1963 | DeSantis et al. | 330/43 X |
| 3,165,696 | 1/1965 | Poole | 330/43 X |
| 3,249,889 | 5/1966 | Brocato | 331/82 |
| 3,293,479 | 12/1966 | Chalk | 330/43 X |
| 3,737,713 | 6/1973 | Kalish | 315/3.5 |
| 3,849,701 | 11/1974 | Kerfoot et al. | 315/3.5 |

FOREIGN PATENTS OR APPLICATIONS

| | | | |
|---|---|---|---|
| 74,801 | 1/1956 | France | 330/43 |

*Primary Examiner*—Saxfield Chatmon, Jr.
*Attorney, Agent, or Firm*—Limbach, Limbach & Sutton

[57] ABSTRACT

A circuit is provided in a traveling-wave tube package which eliminates the need of manually setting the power supply voltage to match the proper operating voltage of the tube. The circuit utilized within the traveling-wave tube package forms a part of the power supply, the remainder of which is provided externally of the traveling-wave tube package. By selecting the proper circuit components, the traveling-wave tube package can be connected without adjustment to a power supply and still operates at the desired voltage.

20 Claims, 7 Drawing Figures

TRAVELING-WAVE TUBE PACKAGE WITH INTEGRAL VOLTAGE REGULATION CIRCUIT FOR REMOTE POWER SUPPLY

Matter enclosed in heavy brackets [ ] appears in the original patent but forms no part of this reissue specification; matter printed in italics indicates the additions made by reissue.

BACKGROUND OF THE INVENTION

The present invention relates in general to electron discharge devices and more particularly to a traveling-wave tube including electronic circuitry so that no adjustment is required in the field to provide the voltage necessary for proper operation of the traveling-wave tube.

Many complex electronic systems utilize one or more electron discharge devices as traveling-wave tubes and, in general, these traveling-wave tubes are field replaceable; i.e., a tube is replaced directly in the field whenever it fails to meet specifications. However, because the performance of a travelling-wave tube, particularly a low noise traveling-wave tube, is critically dependent upon the high electrode voltages, typically in the range of thousands of volts, supplied by the system's power supply and because it is not unusual to find the regulation of the system power supply just barely within the regulation limits permitted by the traveling-wave tube specifications, operation of the traveling-wave tube within specified performance can be achieved only if the error in setting electrode voltages is extremely small. A typical cathode helix voltage regulation specification for a low-noise traveling-wave tube with a helix slow-wave structure is at most ±0.5 percent.

Presently, one common method in field adjustment of low-noise traveling-wave tubes is to adjust the cathode-to-helix voltage for optimum small signal gain at the highest operating frequency. This method has the advantage of not requiring an accurate voltmeter since the voltage is not even measured; however, it does require much more skill in setting the voltage. Furthermore, the design of equipment may require certain modifications to permit a small signal gain measurement. Another difficulty is that many low-noise traveling-wave tubes exhibit optimum performance at a voltage different from that producing maximum gain at the highest operating frequency. Finally, this procedure does not provide a method for accurately setting the various anode voltages, necessary in low-noise traveling-wave tubes, without use of an accurate voltmeter which has a very high internal impedance.

As a general rule voltmeters with the required accuracy for setting the electrode voltage are not available in the field. Therefore, optimum performance is seldom achieved in replacement traveling-wave tubes. Even when accurate voltmeters are available in the field, they require frequent calibration checks which are often logistically impossible. Additionally, required accuracy is difficult to achieve even if the particular meter setting happens to be a full scale reading, and danger to the operator exists in setting up such a meter to read a high voltage.

Coupled with the problem of proper setting of the cathode-to-helix voltage in low noise traveling-wave tubes is the setting of various anode voltages for multiple anode electron guns present in all low noise traveling-wave tubes. The required anode voltages are determined by the particular design of the low noise gun. Because of manufacturing tolerances there is rather a wide variation in anode voltages from tube to tube, but the tolerance within which these voltages must be set in order to achieve the desired noise figure is only about ±1.0 percent of the nominal values. Thus, the problems encountered in setting the anode voltages are similar to, and as difficult as, those encountered in setting the cathode-to-helix voltage.

In another prior art system a voltage bridge network is connected within the traveling-wave package between the cathode and slow-wave structure of the traveling-wave tube. The bridge network is adjusted by the manufacturer such that a reading can be made in the field across the bridge of the bridge network, and the voltage applied between the electrodes adjusted until a null reading exists in the measuring device. At this point a desired predetermined voltage exists between the electrodes. Such a system is more fully described in a pending patent application entitled "Electron Discharge Device with Integral Voltage Bridge and Method of Setting Same," filed Feb. 3, 1969, Ser. No. 796,133, by James L. Palmer and G. E. Tallmadge, and assigned to the assignee of the present invention. Such a system, while an improvement over the previously described prior art system, still has the significant disadvantage that a null reading must be taken to provide the proper voltage setting and complete interchangeability of tubes and supplies without adjustment is not possible.

SUMMARY OF THE INVENTION

These and other difficulties of the prior art systems are eliminated in accordance with one aspect of the present invention by providing within the traveling-wave tube package electronic circuitry for automatically regulating the voltage across the traveling-wave tube regardless of the power supply provided. This is accomplished by including within the traveling-wave tube package those elements normally associated with the power supply which are effective in determining the output parameters of the power supply.

More particularly, a typical power supply for a traveling-wave tube includes a reference voltage supply, an input resistance connected between the reference voltage and a high gain amplifier, and a feedback resistor connected between the output and the input of the amplifier. It will be shown subsequently that the output voltage $V_{out}$ of the aforedescribed power regulator is substantially a function of three parameters of such a power supply, according to the relationship;

$$V_{out} = -V_{ref}\frac{R_b}{R_a}$$

where $V_{out}$ is the output voltage from the amplifier which is applied across the cathode to helix terminals of a traveling-wave tube, $V_{ref}$ is the reference voltage, $R_b$ is the feedback resistance and $R_a$ is the input resistance.

Accordingly, by including the circuit elements determinative of the $V_{out}$ within the traveling-wave tube package, the output voltage applied to the traveling-wave tube will be a predetermined constant and will require no adjustment in the field.

According to another aspect of the present invention, nly certain rather than all of the aforesaid circuit lements determinative of $V_{out}$, are included within the aveling-wave tube and those not included are precise. herefore, the desired $V_{out}$ will be obtained.

It is therefore an object of the present invention to rovide an improved traveling-wave tube which has nproved operating characteristics due to more accuately provided operating voltages.

Another object of the present invention is to provide traveling-wave tube which is adjusted for proper opration during manufacturing and does not require rther adjustment in the field.

Another object of the present invention is to provide traveling-wave tube tube package with separable ower supply and tube but with complete field interhangeability of tube and power supply without adjustent.

Still another object of the present invention is to rovide electronic circuitry within an electron disharge device such that the device is operable over a ange of field applied voltages.

DETAILED DESCRIPTION OF THE DRAWINGS

Figure 1:
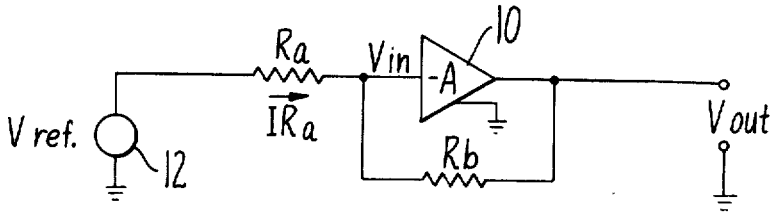
FIG. 1 is a schematic diagram of a basic power supply ircuit used with traveling-wave tubes.

FIG. 1 illustrates a highly stable fixed gain power upply suitable for use with a traveling-wave tube. The ower supply includes a high gain amplifier 10. A reference voltage source 12 is provided which is connected o the input of the amplifier 10 through input resistance $R_a$. A feedback resistance $R_b$ is placed across the input nd output terminals of the amplifier 10. The power upply output voltage, $V_{out}$, is taken from the output of mplifier 10. As previously stated, the output voltage $V_{out}$, essentially, is given by:

$$V_{out} = -V_{ref}\frac{R_b}{R_a}$$

This may be derived as follows. If one assumes that an amplifier is an ideal amplifier, with an infinite input impedance, then the input voltage to the amplifier will be equal to ground voltage. While no amplifier can be made which is ideal, commercially available amplifiers have such high input impedance that they may be considered as having the properties of an ideal amplifier for many purposes. Since the input voltage to amplifier 10 is substantially equal to ground potential, the input current to amplifier 10 is zero and hence all the current, $I_R$, flowing through $R_a$ flows through $R_b$, i.e., $$I_{R_b} / I_{R_a} \text{ and since } I_{R_a} = \frac{V_{ref}}{R_a}$$

$$= \frac{V_{ref}}{R_a} \text{ then with } V_{in} = \text{ground voltage,}$$

$$V_{out} = -I_{R_b} R_b \text{ and substituting}$$

$$V_{out} = -V_{ref}\frac{R_b}{R_a}$$

Thus the output voltage is determined substantially by three parameters, i.e., $V_{ref}$, $R_b$, and $R_a$, and by varying or selecting any one or any combination of these three, the desired output voltage for the traveling-wave tube can be set.

According to the present invention, all of the three controlling components are provided within the traveling-wave tube package, or at least one of these components is provided in the traveling-wave tube package and those components not included, or their ratio, is precise. The value or values of the components selected are selected so as to provide the proper output voltage for that particular traveling-wave tube. This simplifies installation of the traveling-wave tube in the field since no adjustment is required during its installation, such adjustment being provided during the manufacturing process.

Figure 2:
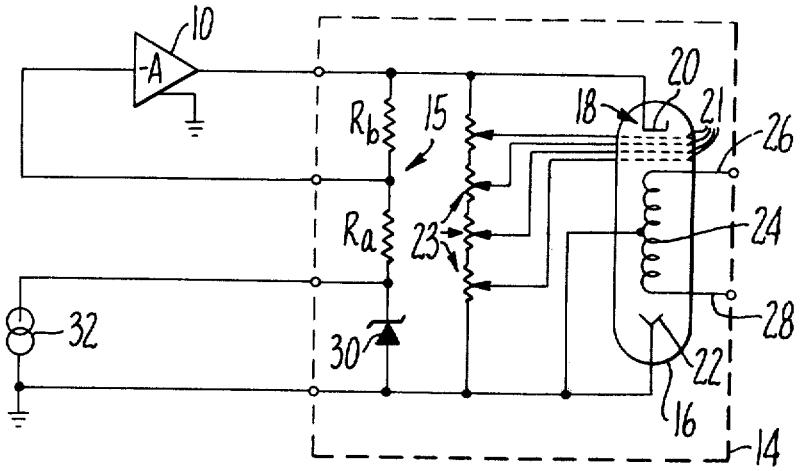
FIG. 2 is a schematic diagram of a traveling-wave ube utilizing aspects of the present invention.

FIG. 2 illustrates the preferred embodiment of the present invention. Shown therein is a traveling-wave tube package 14 of conventional structure which includes an envelope 16 provided with a beam-generating assembly 18 including a cathode 20 at one end position of the envelope 16 for generating and projecting a beam of electrons longitudinally of the envelope 16 to a collector assembly 22. A slow-wave structure 24 such as a helix is positioned between the beam generating assembly 18 and the collector assembly 22 for providing wave-beam interaction between a radio frequency electromagnetic wave traveling along the slow-wave structure 24 from an input waveguide 26 to an output waveguide 28. While the present invention is schematically illustrated and will be described for purposes of illustration as applied to a low power traveling-wave tube utilizing a helix slow-wave structure, it will be appreciated that the invention is applicable for use with tubes having other types of slow-wave structures.

In the case of low noise traveling-wave tubes, a multiple anode low noise electron gun it utilized, and the appropriate voltages intermediate the cathode voltage and ground are established on anodes 21 with potentiometers 23 which can be factory adjusted to the desired auxiliary voltage when the proper cathode voltage is applied. For simplicity this low noise gun will not be illustrated in the other embodiments.

The traveling-wave tube is operated with application of a high voltage between the cathode and the slow-wave structure. Provided within the traveling-wave tube package 14 is bridge circuit 15 including feedback resistor $R_b$ and an input resistor $R_a$ which are connectable in the same manner as shown in FIG. 1 with an externally provided amplifier 10, also identical to the one shown in FIG. 1. Connected between the input resistor $R_a$ and ground is Zener diode 30 having a breakdown voltage equal to the desired reference voltage. To maintain the Zener diode at its breakdown potential, a current supply 32 is provided. Both the amplifier 10 and the current supply 32 are physically separate from the traveling-wave tube package 14 in the embodiment shown in FIG. 2. Since the traveling-wave tube package 14 includes the three determining elements of the power supply, i.e., $R_b$, $R_a$ and Zener 30 which provides the reference voltage, $V_{ref}$, the voltage supplied to the tube 16 is self-regulating and all that is required when a tube is replaced in the field is that an amplifier and a current source be provided for operation of the tube. No adjustments are required during the installation of the tube. This results in reduced labor cost and also provides a more accurate discharge tube voltage than possible with manual adjustment in the field. All the advantages of an integral amplifier approach (combined power supply and tube) are achieved and at the same time the disadvantages usually associated with a separable amplifier are eliminated.

Figure 3:
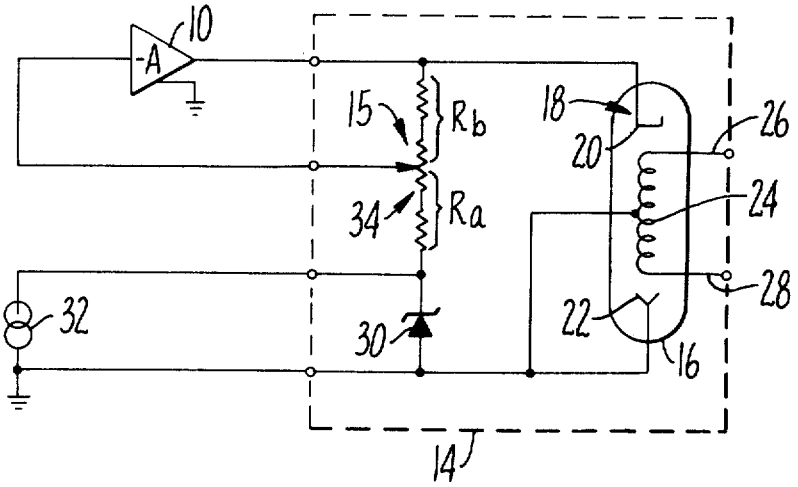
FIG. 3 is a schematic diagram similar to that shown in IG. 2 and showing another embodiment of the present nvention.

FIG. 3 is similar to FIG. 2 with the exception that an additional variable resistance 34 is provided in bridge 15. Since the output voltage is a function of the ratio of $R_b$ and $R_a$, by including the variable resistance 34 it is a simple matter to adjust the ratio of $R_b$ to $R_a$ while in the factory to provide the proper ratio.

Figure 4:
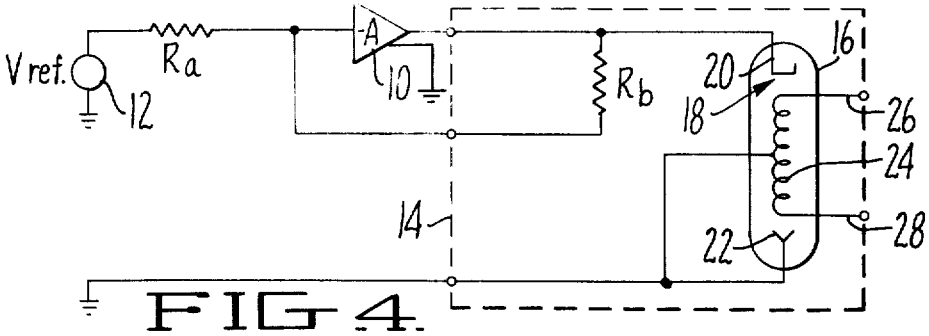
FIGS. 4, 5, 6 and 7 are schematic diagrams illustrating still other embodiments of the present invention.

In some situations it is less desirable to provide all of the three controlable elements of the power supply within the discharge tube package, as, for example, when a less expensive or a less bulky traveling-wave tube package is required. Referring to FIG. 4, only the feedback resistance $R_b$ is provided within the traveling-wave tube package 14. The input resistance $R_a$ and the reference voltage source 12 are external to the traveling-wave tube package 14. However, as long as the critical element or elements which are in the power supply are precisely the same value or precisely the same ratio of values, the critical element or elements in the tube package can be adjusted to match the tube to all power supplies.

Figure 5:
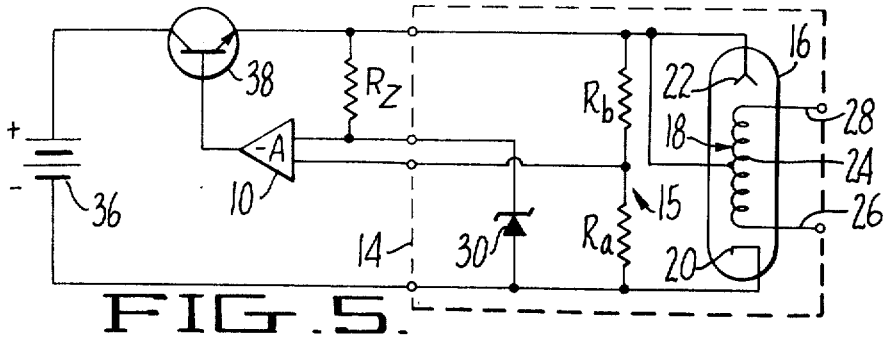

FIG. 5 is similar to FIG. 2 except that an additional power stage is provided, including a direct current source or battery 36 and transistor 38. Additionally, amplifier 10 is of the type characterized as a differential amplifier. A resistance $R_z$ is provided externally of the traveling-wave tube package 14 as a part of the current supply required to maintain Zener diode 30 in the breakdown condition.

Figure 6:
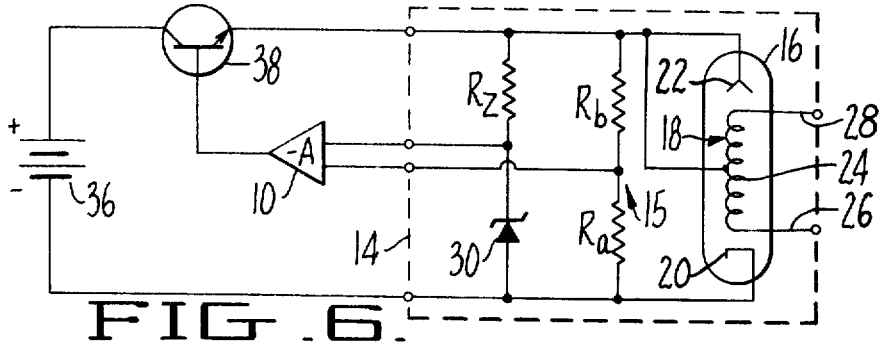

The embodiment shown in FIG. 6 is identical with that in FIG. 5 with the exception that resistor $R_z$ is also included within the traveling-wave tube package 14.

Figure 7:
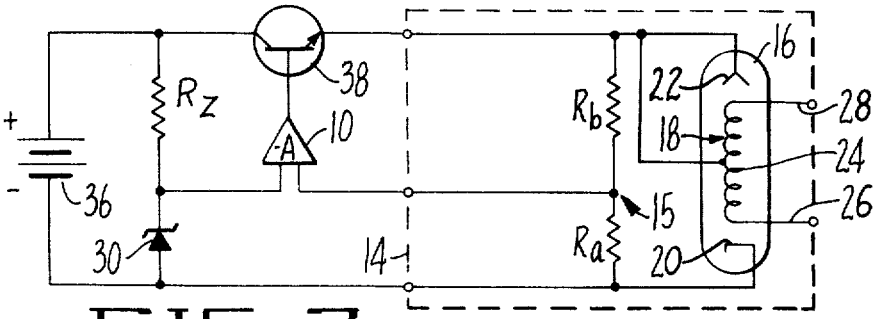

FIG. 7 is identical with FIG. 5 except that Zener diode 30 is included with the externally provided portion of the power supply rather than within the traveling-wave tube package. This arrangement requires a precise value for the Zener diode for complete interchangeability.

While the present invention has been described above in sufficient detail to enable a person skilled in the art to practice the invention, by way of further illustration the component values used for a typical circuit illustrated in FIG. 3 are listed in the following table.

TABLE 1

| | |
|---|---|
| Zener diode 30 | 1N4773 A having a breakdown voltage of 9.1 volts |
| $R_b$ | 12 mΩ |
| $R_a$ | 39 8 KΩ |
| Resistor 34 | 15 KΩ |
| Amplifier 10 | RCA CA 3033A plus additional amplification stages to handle high voltage output |

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A traveling-wave tube assembly having voltage control for use with an associated remote power supply having a high gain amplifier providing sufficient voltages for the electrodes of the traveling-wave tube comprising:

a tube package housing;

a vacuum envelope located within said housing;

a beam generating assembly for generating and projecting a beam of electrons from one position within said envelope to another position therein and including a cathode;

a collector assembly located at said other position for collecting said beam of electrons, a slow-wave structure located between said positions for providing interaction between said beam and a radio frequency wave propagating along said slow-wave structure; and circuit means connected to said tube package housing and remote from the power supply including at least part of a voltage regulation circuit comprising electronic components for operatively cooperating with the high gain amplifier for automatically establishing a predetermined voltage across said cathode and said collector assembly.

2. A traveling-wave tube assembly as in claim 1 wherein said voltage regulation circuit regulates external high gain amplifier and comprises an input impedance, a reference voltage source for soupling to the input of said amplifier through said input impedance, and a feedback impedance for connection between the input and output of said amplifier.

3. A traveling-wave tube assembly as in claim 2 wherein said input impedance, said reference voltage source and said feedback impedance are all connected to said tube package housing and remote from the power supply.

4. A traveling-wave tube assembly of claim 3 wherein said predetermined voltage, $V_{out}$, is determined by the equation:

$$V_{out} = -V_{ref}\frac{R_b}{R_a}$$

and wherein $V_{ref}$ is the voltage of said reference voltage source, $R_b$ is the impedance of said feedback impedance and $R_a$ is the impedance of said input impedance.

5. A traveling-wave tube assembly as in claim 2 wherein at least one of said components consisting of said input impedance, said reference voltage source and said feedback impedance is included in said housing connected circuit means and the other of said components have precise values.

6. An electron discharge device having voltage control comprising:

an electron discharge tube package housing;

a vacuum envelope located within said housing;

a beam generating assembly for generating and projecting a beam of electrons from one position within said envelope to another position therein and including a cathode;

a collector assembly located at said other position for collecting said beam of electrons;

a power supply remote from said housing and including a high gain amplifier; and, circuit means connected to said tube package housing and remote from said power supply and including at least part of a voltage regulation circuit comprising electronic component means for operatively cooperating with said high gain amplifier for automatically establishing a predetermined voltage across said cathode and said collector assembly.

7. The electron discharge device of claim 6 wherein iid voltage regulation circuit regulates said high gain nplifier and comprises an input impedance, a referıce voltage source coupled to the input of said amplier and a feedback impedance connected between the put and output of said amplifier.

8. The electron discharge device of claim 7, wherein iid input impedance, said reference voltage source id said feedback impedance are all included in said ousing connected circuit means.

9. The electron discharge device of claim 8, wherein iid predetermined voltage, $V_{out}$, is determined by the quation:

$$V_{out}=V_{ref}\frac{R_b}{R_a}$$

nd wherein $V_{ref}$ is the voltage of said reference voltage ource, $R_b$ is the impedance of said feedback impednce and $R_a$ is the impedance of said input impedance.

10. The electron discharge device of claim 7, wherein t least one of said components consisting of said input npedance, said reference voltage source and said edback impedance is included in said housing conected circuit means and the other of said components ave precise values.

*11. A traveling-wave tube assembly having voltage ontrol for use with an associated power supply having a igh gain amplifier providing sufficient voltages for the lectrodes of the traveling-wave tube comprising:*

*a tube package housing;*

*a vacuum envelope located within said housing;*

*a beam generating assembly for generating and projecting a beam of electrons from one position within said envelope to another therein and including a cathode;*

*a collector assembly located at said other position for collecting said beam of electrons;*

*a slow-wave structure located between said positions for providing interaction between said beam and a radio frequency wave propagating along said slow-wave structure; and*

*circuit means connected to said tube package housing and remote from the power supply including at least part of a voltage regulation circuit comprising electronic components for operatively cooperating with the high gain amplifier for automatically establishing a predetermined voltage across said cathode and said slow-wave structure.*

*12. A traveling-wave tube assembly as in claim 11 vherein said voltage regulation circuit regulates external iigh gain amplifier and comprises an output impedance, t reference voltage source for coupling to the input of aid amplifier through said input impedance, and a feedıack impedance for connection between the input and ıutput of said amplifier.*

*13. A traveling-wave tube assembly as in claim 12 vherein said input impedance, said reference voltage ource and said feedback impedance are all connected to aid tube package housing and remote from the power upply.*

*14. A traveling-wave tube assembly of claim 13 wherein said predetermined voltage, $V_{out}$, is determined by the equation:*

$$V_{out}=V_{ref}\frac{R_b}{R_a}$$

*and wherein $V_{ref}$ is the voltage of said reference voltage source, $R_b$ is the impedance of said feedback impedance and $R_a$ is the impedance of said input impedance.*

*15. A traveling-wave tube assembly as in claim 12 wherein at least one of said components consisting of said input impedance, said reference voltage source and said feedback impedance is included in said housing connected circuit means and the other of said components have precise values.*

*16. An electron discharge device having voltage control comprising:*

*an electron discharge tube package housing;*

*a vacuum envelope located within said housing;*

*a beam generating assembly for generating and projecting a beam of electrons from one position within said envelope to another position therein and including a cathode;*

*a collector assembly located at said other position for collecting said beam of electrons;*

*a slow-wave structure located between said positions for providing interaction between said beam and a radio frequency wave propagating along said slow-wave structure;*

*a power supply remote from said housing and including a high gain amplifier; and*

*circuit means connected to said tube package housing and remote from said power supply and including at least part of a voltage regulation circuit comprising electronic component means for operatively cooperating with said high gain amplifier for automatically establishing a predetermined voltage across said cathode and said slow-wave structure.*

*17. The electron discharge device of claim 16 wherein said voltage regulation circuit regulates said high gain amplifier and comprises an input impedance, a reference voltage source coupled to the input of said amplifier and a feedback impedance connected between the input and output of said amplifier.*

*18. The electron discharge device of claim 17, wherein said input impedance, said reference voltage source and said feedback impedance are all included in said housing connected circuit means.*

*19. The electron discharge device of claim 18, wherein said predetermined voltage, $V_{out}$, is determined by the equation:*

$$V_{out}=V_{ref}\frac{R_b}{R_a}$$

*and wherein $V_{ref}$ is the voltage of said reference voltage source, $R_b$ is the impedance of said feedback impedance and $R_a$ is the impedance of said input impedance.*

*20. the electron discharge device of claim 17, wherein at least one of said components consisting of said input impedance, said reference voltage source and said feedback impedance is included in said housing connected circuit means and the other of said components have precise values.*

* * * * *